A. L. TODD & M. NELSON.
DIRECTION INDICATOR FOR VEHICLES.
APPLICATION FILED FEB. 16, 1917.
1,232,124.
Patented July 3, 1917.
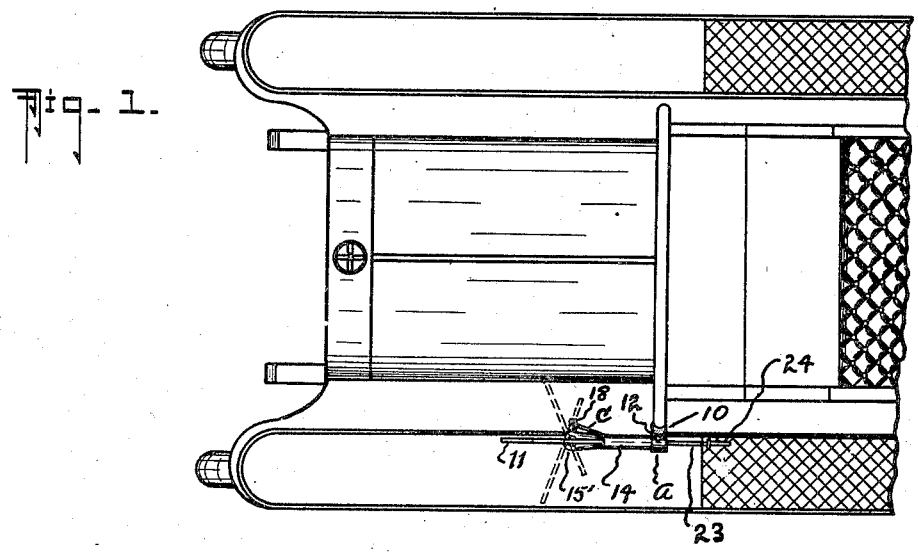
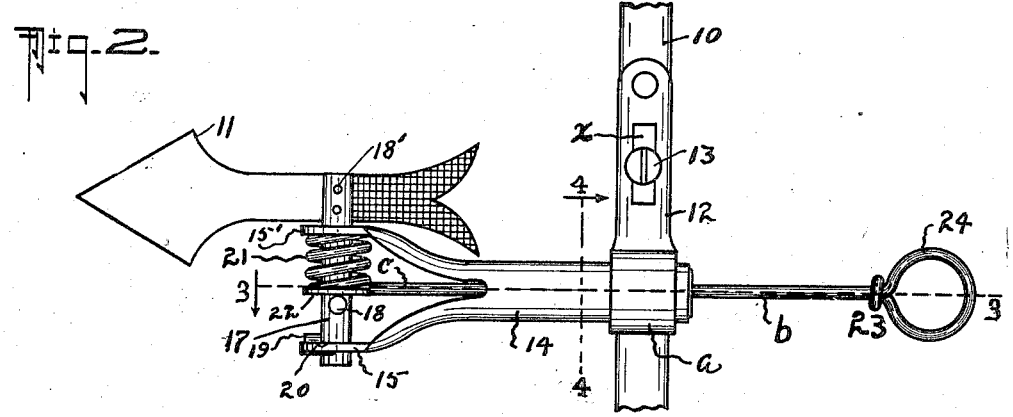
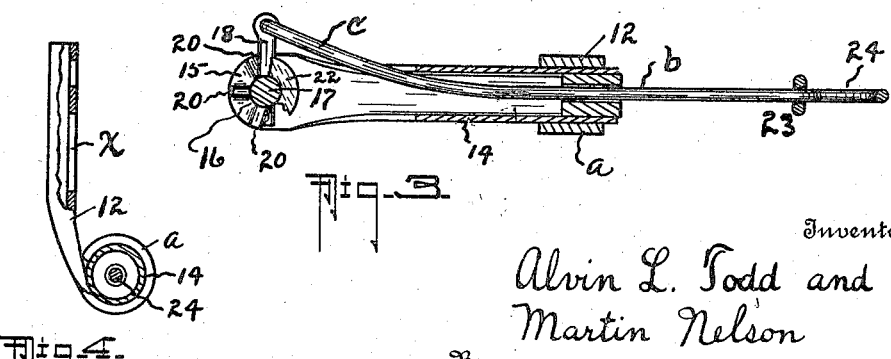
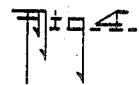
Inventors.
Alvin L. Todd and
Martin Nelson
By Arthur H. Sturges.
Attorney

UNITED STATES PATENT OFFICE.

ALVIN L. TODD AND MARTIN NELSON, OF PLATTSMOUTH, NEBRASKA.

DIRECTION-INDICATOR FOR VEHICLES.

1,232,124.      Specification of Letters Patent.      Patented July 3, 1917.

Application filed February 16, 1917. Serial No. 148,969.

*To all whom it may concern:*

Be it known that we, ALVIN L. TODD and MARTIN NELSON, citizens of the United States, residing at Plattsmouth, in the county of Cass and State of Nebraska, have invented certain new and useful Improvements in Direction-Indicators for Vehicles, of which the following is a specification.

This invention relates to an indicating attachment for vehicles, and more particularly for motor vehicles. It has for its object to provide a visible index which may be mounted upon the vehicle in a manner to be under convenient control of a driver for being swung horizontally at an angle to the line of travel for indicating to others the direction in which the vehicle is to be driven, so that accidental collisions or injuries may be avoided, specially when the vehicle is to be driven upon curves or at street intersections.

On account of the speed at which motor vehicles are usually driven and the uncertainty as to the direction which may be chosen by drivers at street crossings, frequent accidents have occurred and it is a custom or rule for a driver to raise his arm either to the right or left, to visibly indicate to others the curves or direction which he intends to drive. The construction shown herein has been found to be of advantage since, by its use, the hands of the driver may be free for the control of the various devices required for a proper management of the vehicle.

With the foregoing objects in view, the invention presents a novel construction, combination and arrangement of parts as described herein and claimed and as illustrated in the accompanying drawing herein,—

Figure 1 is a plan view showing the front part of an automobile with the indicating attachment applied thereto. Fig. 2 is a side view of the device attached to a part of the frame of a windshield. Fig. 3 is a plan view of the operating rod and crank arm, being a section on line 3—3 of Fig. 2. Fig. 4 is a side view, partly broken, of a holder or clamping-plate, being a section on line 4—4 of Fig. 2.

Referring now to the drawing, numeral 10 indicates a standard or support upon which is mounted the index 11, said support preferably being the end of the windshield, the index being so arranged that it may be swung horizontally either to the right or left of the line of travel and maintained in either of those positions, as long as required, or may be maintained parallel with the line of travel.

The index may consist of any suitable, rectilinear, attenuated object having a length or area sufficient to be readily seen by pedestrians or drivers of vehicles upon or near the intersections of streets or highways, the form of an arrow, as shown, being preferred, and as an aid to visibility, the rear part of the index should be of a dark color, or black.

The index is provided with such bearings that when mounted upon the vehicle as mentioned it may be swung horizontally in an arc substantially or 180 degrees at the front of the windshield. The means herein shown and preferred for the mounting of the index consists, in part, of a coupling-plate or clamp 12 secured to the frame or standard 10 by means of a screw-bolt 13 disposed in the slot $x$ formed longitudinally in the coupling-plate, which permits vertical adjustments to be made for the index, longitudinally of the frame or standard 10.

The lower end of the plate or clamp terminates in a loop $a$ circumscribing the tubular arm 14, as best shown in Fig. 4. The arm 14 preferably is brazed to the clamp and extends outwardly therefrom at a right angle, its outer end portion being divided and formed divergent to define a pair of prongs as best shown in Fig. 2, with flat, terminal bearing-plates 15 and 15', preferably of disk-form, said bearing-plates being centrally apertured as indicated at 16 (Fig. 3).

Numeral 17 indicates a spindle having bearings in the apertures 16 of the bearing-plates 15 and 15', upon the upper end of said spindle, outwardly of the plate 15', being mounted, by means of keepers 18', the index or arrow 11. The spindle is provided between its ends with a crank-arm 18 and a contact-pin 19, the latter being disposed radially of the spindle and parallel with the index 11.

Numerals 20 indicate channels or recesses which are formed radially in the inner face of the bearing-plate 15, and by means of a coiled spring 21, member 19 will be pressed upon the inner face of the last named plate, and when the spindle is rotated, the pin 19 will normally be detained or held in a recess or channel, the upper end of the spring bearing upon the upper plate 15′. Numeral 22 indicates a washer interposed between the lower end of the spring and the crank-arm, tending to prevent friction.

As thus described, if the spindle 17 is rotated, the index and pin 19 swing horizontally; and for rotating the spindle during operation, a pull-and-push rod 23 is provided, said rod having bearings for its rectilinear part $b$ in the tubular arm 14, and having a curved part $c$ extending outwardly from and transversely of the prongs of said arm, as best shown in Fig. 3, for a mounting of its outer end on the crank-arm 18, the rear end of the rod being provided with a loop 24 for convenient control by the driver.

It will be understood that when driving, the contact-pin engages in the middle channel of the three channels shown, the arrow indicating that the vehicle is to be driven without turning, and, upon approaching a crossing, the driver should pull the operating rod rearwardly if the vehicle is to perform a right curve, the index swinging substantially 90 degrees; and the rod should be pushed forwardly if the driver intends to cause the vehicle to perform a left curve, in all instances the spring causing the contact-pin to remain in a channel for maintaining the index in a chosen position or at the desired angle. The index may have any suitable form, size or proportion, and while the windshield is preferred for the mounting of the device, it may, of course, be mounted upon any upright part of the vehicle.

Having fully described our invention, what we claim and desire to secure by Letters Patent is,—

1. A direction indicator for vehicles, comprising, in combination with a standard, a clamping member mounted longitudinally adjustable on the standard, a horizontal arm carried by the clamping member and projecting forwardly of the standard, said arm being provided with a pair of opposed outwardly divergent prongs having apertures formed in their terminals, one of said prongs being provided with radially disposed recesses opening on its aperture, an upright spindle engaging in the apertures of the prongs, said spindle being provided between its ends with a crank and a contact-pin and provided at one of its ends with an index, said crank being adapted to be actuated for causing swinging movements of the contact-pin and index in an arc substantially of 180 degrees, and resilient means to cause a pressure of the contact-pin upon a prong during the swinging movements thereof and for normally maintaining the pin in engagement with a recess.

2. In a direction indicator for vehicles, the combination with a standard, a clamping member on the standard, a horizontal arm carried by the clamping member and provided with a pair of opposed outwardly divergent prongs, one of said prongs being provided with an upright spindle having rotatable bearings in the prongs, said spindle being provided between its ends with a crank and a contact-pin and provided at one of its ends with an index, the crank being movable to rotate the spindle for causing swinging movements of the index and contact-pin in an arc substantially of 180 degrees, and resilient means tending to press the contact-pin upon a prong and to detain said pin in engagement with a recess during a rotatable movement of the spindle.

3. A direction indicator for vehicles, comprising, in combination with a standard, a clamping member mounted longitudinally adjustable on the standard, a tubular arm carried by the clamping member at right angles thereto and provided with a pair of opposed prongs, each being flattened at its terminal to provide a bearing-plate, one of said bearing-plates having recesses formed radially in its inner side, an upright spindle provided between its ends with a contact-pin and a crank and provided at one of its ends with an index, a pull-and-push rod traversing said tubular arm in engagement with the crank and adapted to be reciprocated for causing swinging movements of the contact-pin and index in an arc substantially of 180 degrees, and a helical spring between the crank and one of said prongs for pressing the contact-pin upon the inner face of a bearing plate of a prong to normally maintain the pin in engagement with a recess during the swinging movements of said pin and index.

4. A direction indicator for vehicles, comprising, in combination with a standard, a tubular arm carried by the standard and provided with a pair of opposed bearing-plates, one of said plates being provided with radially disposed recesses on its inner side, an upright spindle journaled in the bearing-plates and provided at its upper end outwardly of the bearing-plates with an index and provided between its ends with a crank and a contact-pin, a rod traversing the crank and a contact-pin, a rod traversing the tubular arm in engagement with the crank and adapted to be reciprocated for rotating the spindle to cause swinging movements of the contact-pin and index in an arc substantially of 180 degrees, and resilient means to cause a pressure of the contact-pin upon a bearing-plate during the swinging movements of said contact-pin for normally detaining the pin in engagement with a recess.

5. In a direction indicator for vehicles, the combination with an upright support, a clamping member arranged for longitudinal adjustments on the support, a horizontal arm carried by the clamping member and provided with a pair of opposed apertured bearing-plates, one of said plates being provided on its inner side with radially disposed recesses, an upright rotatable spindle journaled in the apertures of the prongs, said spindle being provided outwardly of the bearing-plates with an index and provided between its ends with a contact-pin, and resilient means to cause a pressure of the contact-pin upon a bearing-plate to normally hold the pin in engagement with one of said recesses after the spindle has been rotated.

In testimony whereof, we have affixed our signatures in presence of two witnesses.

ALVIN L. TODD.
MARTIN NELSON.

Witnesses:
HIRAM A. STURGES,
ARTHUR H. STURGES.